US008229076B2

(12) United States Patent
Wollmershauser et al.

(10) Patent No.: US 8,229,076 B2
(45) Date of Patent: *Jul. 24, 2012

(54) LINE LOSS TESTER

(75) Inventors: Steven M. Wollmershauser, San Antonio, TX (US); Yolius Diroo, San Antonio, TX (US); Edward A. Walter, Boeme, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 132 days.

This patent is subject to a terminal disclaimer.

(21) Appl. No.: 12/748,995

(22) Filed: Mar. 29, 2010

(65) Prior Publication Data

US 2010/0172478 A1    Jul. 8, 2010

Related U.S. Application Data

(63) Continuation of application No. 11/408,920, filed on Apr. 24, 2006, now Pat. No. 7,729,476.

(51) Int. Cl.
*H04M 1/24* (2006.01)
*H04M 3/08* (2006.01)
*H04M 3/22* (2006.01)

(52) U.S. Cl. ........ 379/1.01; 379/1.04; 379/24; 379/29.1

(58) Field of Classification Search ................. 379/1.01, 379/1.03, 1.04, 9, 12, 19, 20, 21, 22, 22.02, 379/22.07, 22.08, 23, 24, 27.01, 29.01, 31
See application file for complete search history.

(56) References Cited

U.S. PATENT DOCUMENTS

| | | | |
|---|---|---|---|
| 5,140,701 A * | 8/1992 | Zaks ........................... 455/164.1 |
| 5,530,367 A * | 6/1996 | Bottman ....................... 324/616 |
| 6,052,420 A * | 4/2000 | Yeap et al. .................... 375/346 |
| 6,256,377 B1 | 7/2001 | Murphree et al. |
| 6,292,468 B1 * | 9/2001 | Sanderson .................... 370/241 |
| 6,574,308 B1 | 6/2003 | MacDonald et al. |
| 6,584,148 B1 | 6/2003 | Zitting et al. |
| 6,718,019 B1 | 4/2004 | Heidari et al. |
| 6,909,781 B1 | 6/2005 | Itri |
| 6,917,595 B2 * | 7/2005 | Chang et al. .................. 370/248 |
| 7,034,546 B2 | 4/2006 | Manani et al. |
| 7,583,727 B2 * | 9/2009 | Rekai et al. .................... 375/225 |
| 2005/0264299 A1 * | 12/2005 | Manani et al. ................ 324/539 |
| 2008/0174502 A1 | 7/2008 | Oren et al. |

* cited by examiner

*Primary Examiner* — Binh Tieu
(74) *Attorney, Agent, or Firm* — Greenblum & Bernstein, P.L.C.

(57) ABSTRACT

A signal testing apparatus for testing signals includes at least one receiver that receives signals having corresponding frequencies representative of a frequency range of a wired communication link over which the signals are received. The signal testing apparatus also includes a measurer that measures a signal loss for each of the frequencies to determine whether each measured signal loss is acceptable.

19 Claims, 4 Drawing Sheets

LINE LOSS TESTER

This is a continuation of U.S. patent application Ser. No. 11/408,920, filed on Apr. 24, 2006, the content of which is expressly incorporated herein by reference in its entirety.

BACKGROUND

1. Field of the Disclosure

The present disclosure generally relates to automated test equipment and more particularly to determining the integrity of wired communication links by testing for excessive signal loss at various frequencies.

2. Background Information

Numerous services are being offered over enhanced telephone networks, including broadband Internet access and high definition television services, as well as conventional telephone services. Telephony providers enable these services typically through use of digital subscriber line (DSL) technology, including High Speed DSL (HDSL), Very High Speed DSL (VDSL) and Asymmetric DSL (ADSL) services.

When a telephony provider branches into other markets, it is efficient to incorporate existing infrastructure to the extent possible when provisioning new services. For example, a VDSL provider that supports broadband Internet or high definition television services connects to a customer's location through conventional public switched telephone network (PSTN) infrastructure that supports VDSL, including central offices and twisted wire pairs extending to a customer location. Once on premises, though, the VDSL provider may elect to use coaxial cable previously deployed in the customer's home or office (e.g., to support cable television services) to distribute data and video signals to various receivers. However, the VDSL provider must assure that the existing infrastructure adequately supports the requirements of all aspects of the VDSL service, especially across the wire link from the network interface device (NID), which interfaces the customer network and the PSTN, to the customer premises equipment (e.g., a router or residential gateway) that interfaces with the various customer devices.

DSL signal loss currently is measured over wired links, such as coaxial cables, with DSL signals present on the line, indicating only an average loss over the entire frequency range and requiring the presence of DSL signals (e.g., from previously provisioned DSL services). Further, automated testers presently exist that enable technicians to determine electrical resistance across coaxial cables when there is signal from the transmit site present on the line, for example. However, testing resistance does not provide the information necessary to determine whether a wired link supports a frequency spectrum sufficient to enable proper functionality of a particular service, such as VDSL.

BRIEF DESCRIPTION OF THE DRAWINGS

The present disclosure provides the detailed description that follows by reference to the noted drawings by way of non-limiting examples, in which like reference numerals represent similar parts throughout several views of the drawings, and in which.

DETAILED DESCRIPTION

Figure 1:
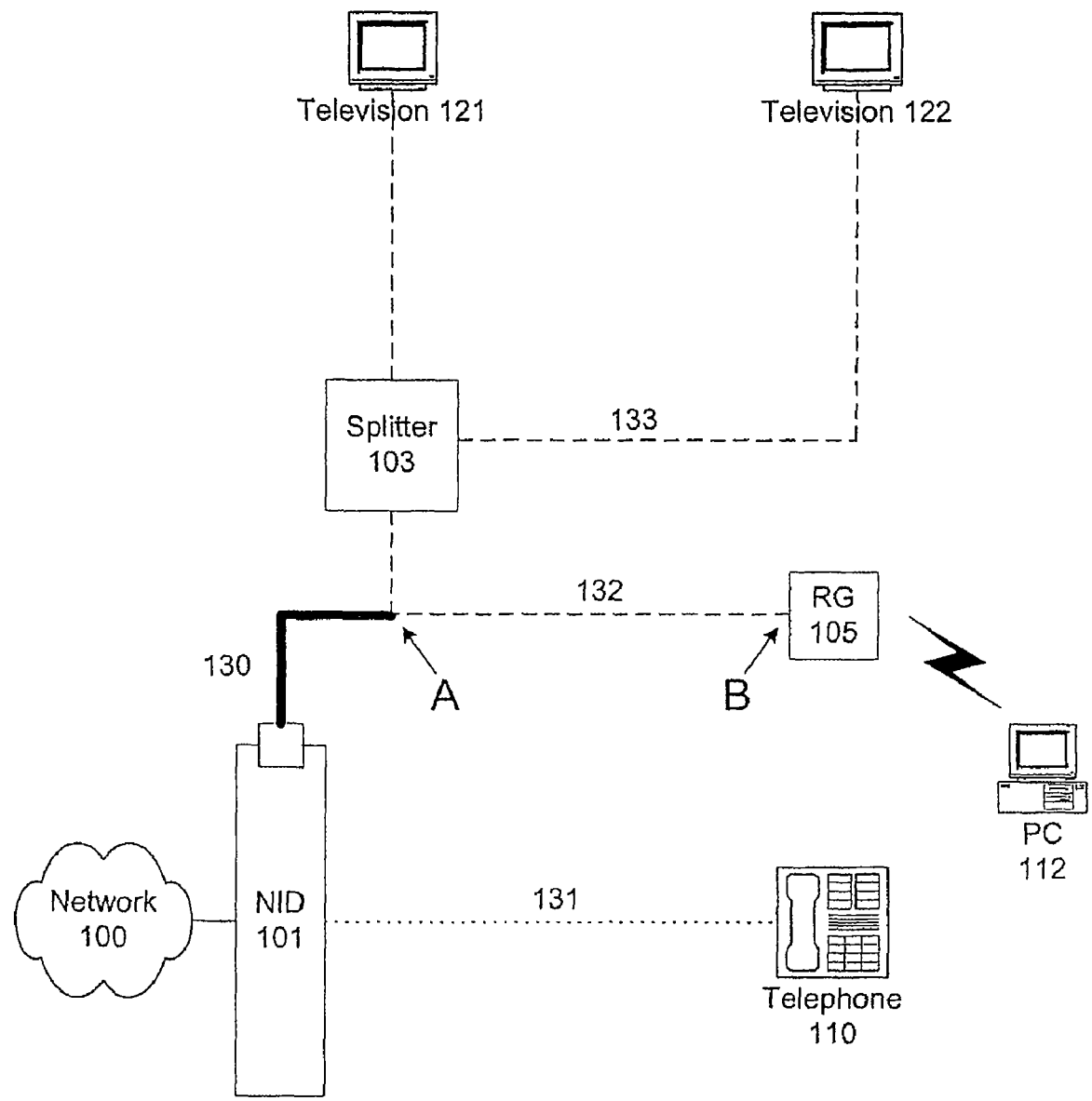
FIG. 1 shows a simplified block diagram of an exemplary customer's premises configured for VDSL integration, according to an aspect of the present disclosure.

The present disclosure relates to a testing apparatus and method for validating the integrity of wiring to ensure that it is capable of supporting broadband telephony services, such as VDSL, before actually connecting the DSL signal to the line. Generally, a transmitter is attached to one end of a portion of wiring to be tested and a receiver is attached to the other end. The transmitter sends signals at multiple frequencies across the section of wiring, which the receiver receives and measures the associated radio frequency (RF) power loss. Excessive loss (e.g., in excess of 3 decibels) at any of the multiple frequencies indicates faulty or potentially inadequate wiring across the tested portion.

An embodiment of the disclosure provides a low cost, portable electronic testing device that can be utilized by a technician installing, maintaining or servicing high speed data and voice services, for example, on a customer's premises. The tester may also be used in the same manner to test passive devices, such as diplexers and splitter/baluns used for VDSL installation, to identify defective equipment. Further, the transmitter and/or the receiver may include conventional resistance testing capability, enabling the technician to perform line loss as well as resistance testing across the same sections of wiring using a single testing tool.

In view of the foregoing, the present disclosure, through one or more of its various aspects, embodiments and/or specific features or sub-components, is thus intended to bring out one or more of the advantages as specifically noted below.

An aspect of the present disclosure provides an apparatus for testing integrity of a wired communication link, such as a coaxial cable and/or a digital subscriber line (DSL) service link. The apparatus includes multiple receivers that receive corresponding signals sent by at least one transmitter over the wired communications link, where the signals have corresponding frequencies within a frequency range of the wired communication link, which frequencies are representative of the frequency range. The apparatus also includes a measurer that measures a signal loss corresponding to each of the frequencies, and an indicator that provides an indication of whether each measured signal loss is within an acceptable range. In an embodiment, the apparatus may further include a resistance tester that tests an electrical resistance on the wired communication link.

The indication of whether each measured signal loss is within an acceptable range may include multiple green indicators corresponding to the frequencies when each measured signal loss is within the acceptable range, and/or at least one red indicator corresponding to at least one of the frequencies when at least one of the frequencies is not within the acceptable range. The indication may include a visual display that displays information regarding whether each measured signal loss is within the acceptable range.

The multiple signals sent by the transmitter may include noise generated across the predetermined frequency range. Each of the receivers may be pre-tuned or adjustably tuned to the multiple frequencies. Alternatively, the multiple signals sent by the transmitter may include pre-tuned or adjustably tuned frequencies, and the receivers may be configured to receive these frequencies.

Another aspect of the present disclosure provides an apparatus for testing integrity of a wired communication link, configured to enable installation of a DSL service, such as a coaxial cable, by receiving at least one signal transmitted through the wired communications link. The apparatus includes multiple receivers tuned to multiple frequencies to receive the at least one signal transmitted through the wired communications link. The apparatus also includes a determiner that measures signal losses corresponding to the multiple frequencies, and determines whether any of the signal losses exceeds a predetermined threshold. The apparatus further includes an indicator that indicates whether any of the signal losses exceeds the predetermined threshold, as determined by the determiner. The indicator may provide a negative indication when any of the signal losses exceeds the predetermined threshold, such as illuminating a light corresponding to each of the signal losses that exceeds the predetermined threshold.

The multiple receivers may be agile receivers that are tunable to the multiple frequencies. Also, the at least one signal transmitted through the communications link may be noise generated across a predetermined frequency range, or the at least one signal may include multiple signals corresponding to the multiple frequencies to which the receivers are tuned.

Another aspect of the present invention provides a method for testing integrity of a wired communication link. The method includes receiving multiple signals transmitted through the wired communication link at multiple frequencies; measuring multiple signal losses corresponding to the multiple frequencies; determining an amount of signal loss for each of the multiple frequencies; and indicating when the determined amount of signal loss for any of the signal losses exceeds a predetermined threshold. The method may also include indicating when each amount of signal loss for all of the signal losses does not exceed the predetermined threshold. The at least one signal transmitted through the communications link may be noise generated across a predetermined frequency range, and the multiple frequencies are representative of the predetermined frequency range.

The various aspects and embodiments of the present disclosure are described in detail below.

FIG. 1 shows a simplified block diagram of an illustrative environment in which the disclosed apparatus and method may be utilized. More particularly, FIG. 1 depicts a customer's premises configured for VDSL or other broadband access integration. The services are provided to the customer's premises over a telephony network 100, such as a public switched telephone network (PSTN), including integrated services digital networks (ISDN), asynchronous transfer mode (ATM) networks, and the like. A network interface device (NID) 101 connects the customer's system to the local loop of the network 100.

The dashed lines 131, 132 and 133 of FIG. 1 indicate preexisting wiring in the customer's premises, which the service provider typically wants to use, to the extent possible, in order to minimize alterations or additions to the existing customer communications network. Line 131 shows a preexisting phone line leading to an exemplary telephone 110. Lines 132 and 133 show preexisting coaxial cable, for example, used for connecting televisions or other video receivers 121 and 122 to a cable services provider. The coaxial cable may likewise have been used to provide high speed Internet access to the personal computer (PC) 112, depending on the customer's particular configuration. Note that, prior to implementation of VDSL or similar broadband telephony service, the coaxial cables 131 would not have terminated at the NID 101, but rather would have interfaced with a cable network (not pictured). The splitter 103 indicates an example of how coaxial cable is typically installed.

In order to integrate the broadband telephony service with the various communications media, a router or residential gateway 105 is added to the customer's network. The residential gateway 105 provides the interfaces necessary to support each type of technology used by the customer, converting to and from the associated formats. For example, the residential gateway 105 may include a VDSL modem for interfacing with the network 100. Also, as shown in the example of FIG. 1, the residential gateway 105 may include a wireless access point, such as Bluetooth or 802.11g technology, enabling a wireless local area network on the customer's premises, which would include, for example, the PC 112.

It is typically desirable for the residential gateway 105 to be installed on a preexisting coaxial cable, such as line 132, since the residential gateway 105 should be centrally located within the premises and may replace, for example, an existing cable modem or router. Also, a new line 130 is usually run from the NID 100 to the existing cable network, which was not previously connected to the NID 101. The new line 130 may also be coaxial cable compatible with the existing lines 132 and 133.

Because line 132 provides the critical link between the residential gateway 105 and the NID 101 (via the new line 130), its integrity must be properly verified prior to installation of the broadband service. This is particularly important to verify when the line 132 has been previously installed by another service provider and, unlike the new line 130, is of an unknown age, condition and quality. The line loss tester of the present disclosure serves this purpose, and can be used to determine the integrity of the line 132, for example, between points "A" and "B" of FIG. 1.

Figure 2:
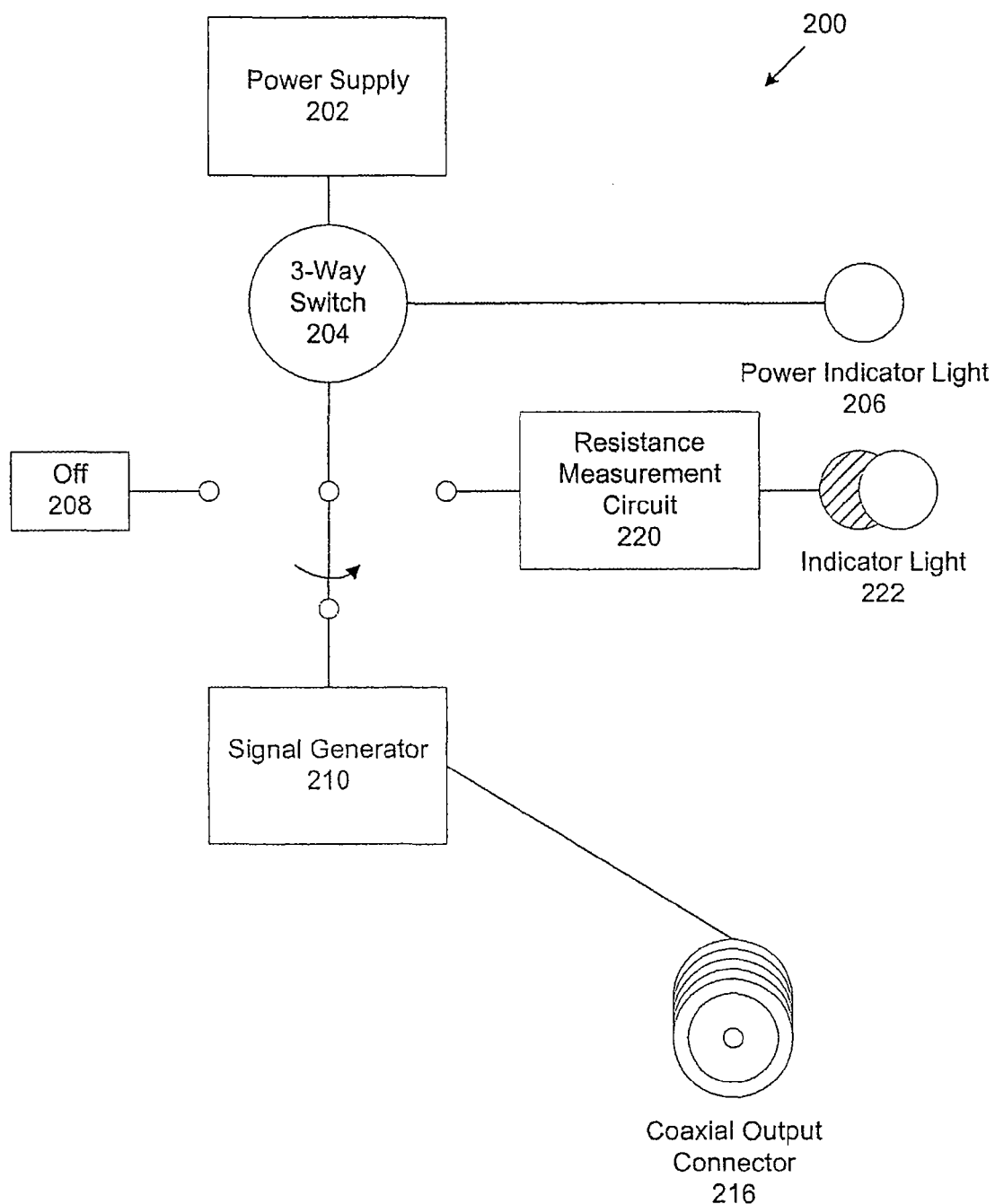
FIG. 2 shows a simplified block diagram of an exemplary transmitter portion of the tester, according to an aspect of the present disclosure.
Figure 3:
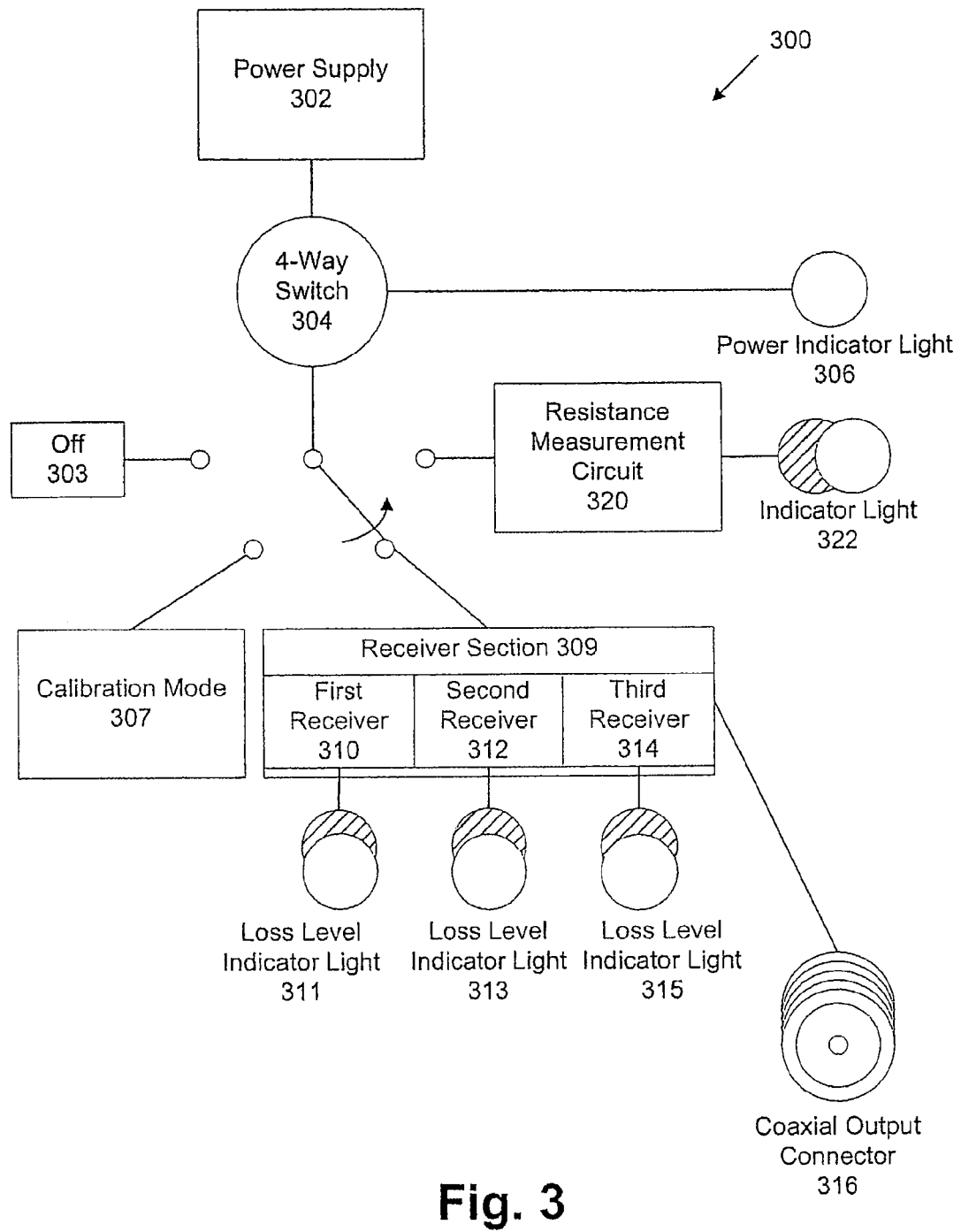
FIG. 3 shows a simplified block diagram of an exemplary receiver portion of the tester, according to an aspect of the present disclosure.

More particularly, the line loss tester includes a transmitter 200 and a corresponding receiver 300, exemplary embodiments of which are depicted in FIG. 2 and FIG. 3, respectively. The transmitter 200 may be attached at point "A" and the receiver 300 may be attached at point "B," so that the integrity of line 132 between these points may be quickly and efficiently evaluated by measuring RF loss, as discussed below.

Referring to FIG. 2, the transmitter 200 includes a power supply 202, which may be a nine volt battery, for example, and a 3-way switch 204. The transmitter 200 is powered down by switching the switch 204 to the OFF position 208. The other positions of switch 204 depicted in the exemplary embodiment activate a signal generator 210 and a resistance measurement circuit 220. When the switch 204 is in the OFF position 208, a power indicator light 206 is off, and when the switch 204 is in any other position, the power indicator light 206 illuminates a green light, such as a green light emitting diode (LED).

In an embodiment, the signal generator 210 includes a noise generator that generates and transmits noise across a spectrum of frequencies, including the frequency range needed to support the telephony service. For example, standardized VDSL requires a frequency spectrum of 25 kHz through 8.5 MHz, which may be accommodated by coaxial cable, such as the line 132. Generating noise across the entire frequency spectrum is particularly efficient, in that the receiver 300 can receive signals having any frequencies within the entire range and be able to determine the integrity of the wired link, as discussed below.

The signal generator 210 sends signals through an adapter, such as the coaxial output connector 216, which is connected, for example, to line 132 at point "A" of FIG. 1. Different embodiments of the transmitter 200 may include various additional connections, such as, for example, an RJ11 connector to plug into phone jacks, a set of universal clips capable of penetrating the jacketing on twisted pair wiring or connecting to terminals such as on the back of jacks or at the protector, and a female 75 ohm connector for connecting to a coaxial network, discussed below with respect to the resistance measurement circuit 220.

In alternative embodiments, the signal generator 210 transmits carrier signals at different specific frequencies, which may require the signal generator 210 to include multiple transmitters tuned to different carrier frequencies. Typically, at least three carrier signals are used, e.g., having low, medium and high frequencies within the desired frequency range needed to support the service. However, any number of multiple frequencies may be incorporated in the tester without departing from the scope and spirit of the present disclosure. The carrier signals may be preset to particular frequencies, such as 25 kHz, 4.0 MHz and 8.5 MHz, or the carrier signals may be adjustable for added versatility.

The transmitter 200 may also include an optional, conventional resistance measurement circuit 220, selectable by operation of the switch 204. This enables additional testing functionality to measure electrical resistance on a line. For example, a low resistance, such as 50 ohms or less, indicates an unusable line, while normal resistance, such as 75 ohms, indicates a usable line. When a line is unusable, the indicator light 222 illuminates a red LED, and when the line is usable, the indicator light 222 illuminates a green LED. Also, the resistance measurement circuit 220 enables identification of multiple lines on the customer premises by attaching resistors in various areas and then connecting the transmitter 200 to a central wiring point. As each line is connected to the transmitter 200, a green indication by the indicator light 222 identifies specific lines having resistors connected at the other end. This further enables the technician to test numerous lines from outside the customer premises using a single testing device. The receiver 300 need not be attached to the other end of a wired link in order to enable the electrical resistance testing.

FIG. 3 depicts the exemplary receiver 300 which is connected, for example, to line 132 of FIG. 1 at point "B." The receiver 300 includes features complementary to those of the transmitter 200. The receiver 300 also includes a power supply 302 and a 4-way switch 304, as well as a power indicator light 306 that illuminates a green LED when the switch 304 is not in the OFF position 303.

A receiver section 309 of the exemplary receiver 300 includes three receivers tuned to different frequencies selected to adequately sample the range of frequencies needed to determine the integrity of the wired link. In the example of FIG. 3, a first receiver 310 is tuned to a low frequency, such as 25 kHz, a second receiver 312 is tuned to a medium frequency, such as 4.0 MHz, and a third receiver 314 is tuned to a high frequency, such as 8.5 MHz, to adequately cover the entire frequency spectrum for VDSL services. However, any number and value of multiple frequencies may be incorporated without departing from the scope and spirit of the present disclosure, so long as the frequencies adequately represent the required range to make an accurate determination of line integrity. The receiving section 309 receives signals transmitted by the signal generator 210 of the transmitter 200 through an adaptor compatible with the line being tested, such as a coaxial output connector 316.

In alternative embodiments, the receivers 310, 312 and 314 may be pre-tuned receivers configured to receive specific, predetermined frequencies, or they may be agile receivers capable of being tuned dynamically to receive any frequencies within the desired range. The frequencies are dependant on the configuration of the transmitter 200. For example, the embodiment in which the signal generator 210 sends generated noise across a frequency spectrum, which is the simplest to implement, the frequencies of the receivers 310, 312 and 314 do not need to match any particular frequency of the transmitter 200. The frequencies need only be within the frequency spectrum and adequately representative of the range required to determine line integrity. However, when the signal generator 201 sends signals on specific different frequencies, either pre-tuned or variable, each of the receivers 310, 312 and 314 must likewise be tuned to receive carriers on these same frequencies for the tester to function properly.

In each embodiment, the receiver section 309 measures the power of the signals received by each of the receivers 310, 312 and 314 and determines whether the RF level is below a predetermined threshold, such as 3 decibels. Indicators corresponding to each of the receivers may be provided to indicate whether the received signals are within acceptable limits. For example, a loss level indicator light 311 illuminates a red LED when the signal received by the first receiver 310 is below the threshold, and illuminates a green LED when the signal received by the first receiver 310 is acceptable. Likewise, loss level indicator lights 313 and 315 provide visual indications corresponding to the signals received by the second receiver 312 and the third receiver 314, respectively. Any indication of acceptable and unacceptable signal levels, such as displayed symbols or audible tones, may be incorporated into the tester without departing from the scope and spirit of the disclosure.

The exemplary receiver 300 also includes a calibration mode 307, which is selected by operation of the switch 304. The calibration mode 307 enables the receiver 300 to be calibrated with the transmitter 200 prior to testing, in order to assure that the receiver section 309 knows the power and, when necessary, the frequencies at which signals are sent by the signal generator 210. The calibration may be accomplished, for example, by directly connecting the transmitter 200 and the receiver 300 through a short piece of coaxial cable.

Further, the exemplary receiver 300 includes an optional resistance measurement circuit 320 and corresponding indicator light 322. The resistance measurement circuit 320 is independent of the resistance measurement circuit 220 of the transmitter 200, and is provided as a convenience to the technician. In other words, electrical resistance of various lines may be tested in conjunction with line loss using either the receiver 300 or the transmitter 200, depending on user preference. The functionality of the resistance measurement circuit 320 is the same as that described above with respect to the resistance measurement circuit 220. Also, like the transmitter 200, different embodiments of the receiver 300 may include various connections, such as, for example, an RJ11 connector to plug into phone jacks, a set of universal clips capable of penetrating the jacketing on twisted pair wiring or connecting to terminals such as on the back of jacks or at the protector, and a female 75 ohm connector for connecting to a coaxial network, discussed above with respect to the resistance measurement circuit 320.

Figure 4:
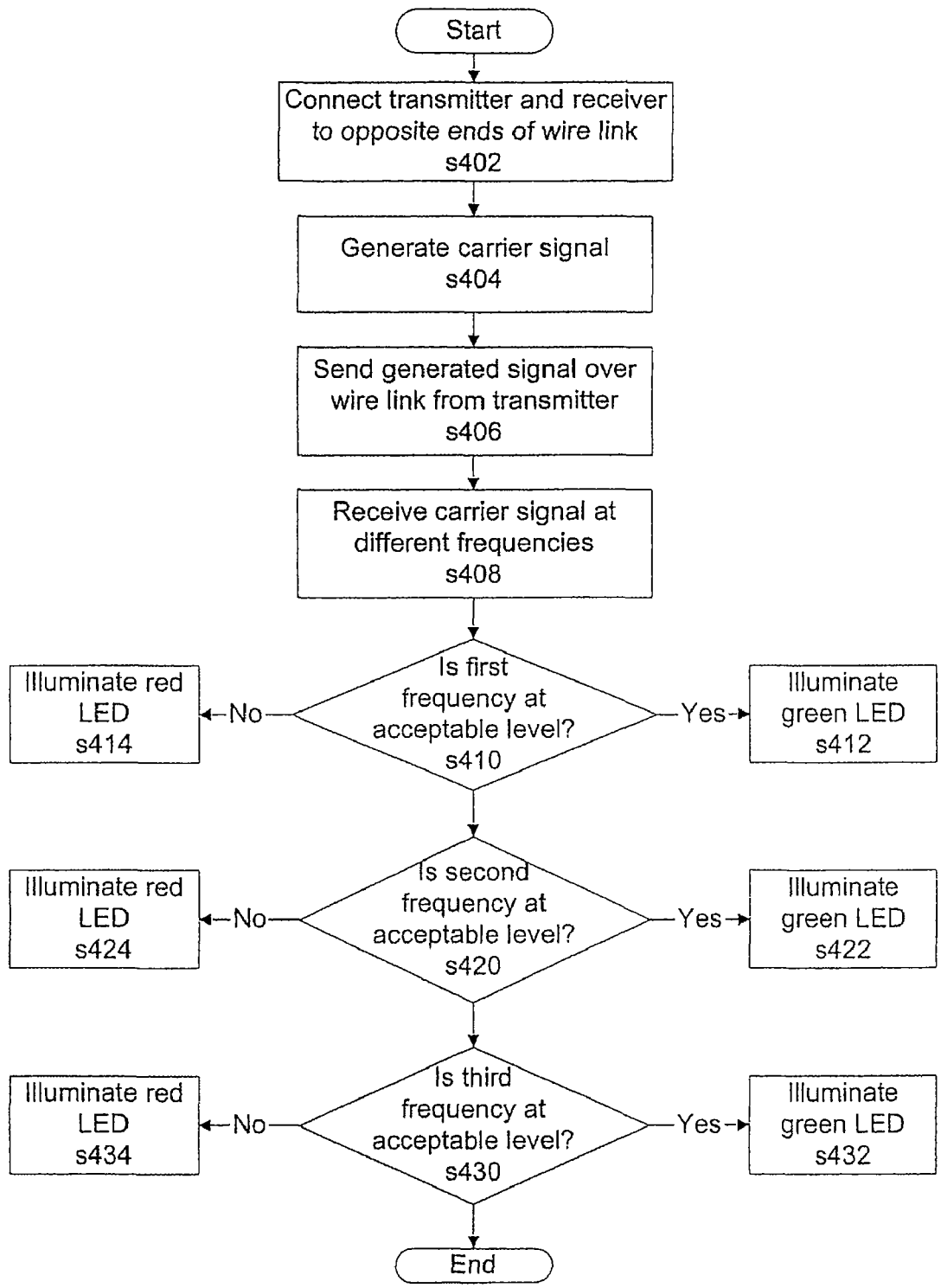
FIG. 4 shows an exemplary flow diagram of an exemplary testing method, according to an aspect of the present disclosure.

As previously disclosed, the transmitter 200 and the receiver 300 are used together to efficiently test the integrity of a wired link, a method of which is depicted in the exemplary flow diagram of FIG. 4. At step s402, the transmitter 200 and the receiver 300 are connected at opposite ends of the link to be tested. For example, the transmitter 200 is connected at point "A" and the receiver 300 is connected at point "B" of line 132 in FIG. 1 in order to test the level of line loss across that portion of line 132. At step s404, the transmitter 200 generates noise to be transmitted across a range of frequencies, or at least one carrier at a specific frequency, which is then transmitted across the wire link at step s406.

The receiver 300 receives the generated signals at step s408, and determines whether the RF loss across the line being tested is acceptable to enable support of the desired services. The receiver section 309 includes multiple receivers, such as the first receiver 310, the second receiver 312 and the third receiver 314, each of which are tuned for different frequencies. At step s410, it is determined whether the signal level corresponding to the frequency received by the first receiver 310 is within limits. If YES, a green LED is illuminated at step s412; if NO, a red LED is illuminated at step s414. At step s420, it is determined whether the signal level corresponding to the frequency received by the second receiver 312 is within limits. If YES, a green LED is illuminated at step s422; if NO, a red LED is illuminated at step s424. At step s430, it is determined whether the signal level corresponding to the frequency received by the third receiver 314 is within limits. If YES, a green LED is illuminated at step s432; if NO, a red LED is illuminated at step s434. When the three green indicators are illuminated, the wire link is acceptable.

Although FIG. 4 depicts a particular sequence of steps, it is understood that the sequence is exemplary to an embodiment, and is not intended to be limiting. For example, in alternative embodiments, the order of the steps may differ, the various steps may occur simultaneously, or the number of frequencies being tested may vary without affecting the scope and spirit of the disclosure. Also, although depicted linearly, the various embodiments may be implemented through various programming techniques with appropriate arrangements.

Although the present specification describes components and functions that may be implemented in particular embodiments with reference to particular standards and protocols, the invention is not limited to such standards and protocols. Each of the standards, protocols and languages represent examples of the state of the art. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope and spirit of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments that fall within the true spirit and scope of the present disclosure. Thus, to the maximum extent allowed by law, the scope of the invention is to be determined by the broadest permissible interpretation of the following claims and their equivalents, and shall not be restricted or limited by the foregoing detailed description.

Although several exemplary embodiments have been described, it is understood that the words that have been used are words of description and illustration, rather than words of limitation. Changes may be made within the purview of the appended claims, as presently stated and as amended, without departing from the scope and spirit of the invention in its aspects. Although the description refers to particular means, materials and embodiments, the invention is not intended to be limited to the particulars disclosed, but rather extends to all functionally equivalent structures, methods, and uses such as are within the scope of the appended claims.

What is claimed:

1. A signal testing apparatus for testing signals, comprising:
   at least one transmitter that transmits a plurality of signals having a corresponding plurality of frequencies representative of a frequency range of a wired communication link over which the plurality of signals are transmitted;
   at least one receiver that receives the plurality of signals having the corresponding plurality of frequencies representative of the frequency range of the wired communication link over which the plurality of signals are received;
   a measurer that measures a signal loss for each of the plurality of frequencies to determine whether each measured signal loss is acceptable; and
   at least one indicator that provides indication of whether each measured signal loss is acceptable.

2. The signal testing apparatus according to claim 1, wherein the at least one indicator indicates whether each measured signal loss is within an acceptable range.

3. The signal testing apparatus according to claim 2, wherein the at least one indicator indicates whether each measured signal loss exceeds a predetermined threshold.

4. The signal testing apparatus according to claim 2, wherein the at least one indicator provides an audible indication of whether each measured signal loss is acceptable.

5. The signal testing apparatus according to claim 2, wherein the at least one indicator provides a visual indication of whether each measured signal loss is acceptable.

6. The signal testing apparatus according to claim 5, wherein the at least one indicator provides a first color indication to indicate whether each measured signal loss is acceptable, and
wherein the at least one indicator provides a second color indication to indicate whether each measured signal loss is not acceptable.

7. The signal testing apparatus according to claim 1, wherein the at least one receiver comprises a plurality of receiving components of a single integrated testing device.

8. The signal testing apparatus according to claim 1, wherein the plurality of signals are received from the at least one transmitter and comprise noise generated across the frequency range by the at least one transmitter.

9. The signal testing apparatus according to claim 1, wherein each of the at least one receiver is pre-tuned to the plurality of frequencies.

10. The signal testing apparatus according to claim 1, wherein each of the at least one receiver is adjustably tuned to the plurality of frequencies.

11. The signal testing apparatus according to claim 1, wherein the wired communication link comprises a digital subscriber line service link.

12. The signal testing apparatus according to claim 1, wherein the wired communication link comprises a coaxial cable.

13. The signal testing apparatus according to claim 1, further comprising:
a resistance tester that tests an electrical resistance on the wired communication link.

14. The signal testing apparatus according to claim 8, wherein a passive device is connected to the wired communication link between the signal testing apparatus and the at least one transmitter.

15. The signal testing apparatus according to claim 1, wherein the signal testing apparatus measures signal loss on a wired communication link between a residential gateway and a network interface device.

16. A signal testing apparatus for testing signals, comprising:
at least one transmitter that transmits to a tangible passive device a plurality of signals having a corresponding plurality of frequencies representative of a frequency range of a wired communication link over which the plurality of signals are transmitted;
at least one receiver that receives, from the tangible passive device, the plurality of signals having the corresponding plurality of frequencies representative of the frequency range of the passive device;
a measurer that measures a signal loss for each of the plurality of frequencies to determine whether each measured signal loss is acceptable; and
at least one indicator that provides indication of whether each measured signal loss is acceptable.

17. The signal testing apparatus according to claim 16, wherein the at least one receiver comprise agile receivers that are tunable to the plurality of frequencies.

18. A method for testing signals, comprising:
transmitting, by at least one transmitter of a device, a plurality of signals having a corresponding plurality of frequencies representative of a frequency range of a wired communication link over which the plurality of signals are transmitted;
receiving, by at least one receiver of the device, the plurality of signals having the corresponding plurality of frequencies representative of the frequency range of the wired communication link over which the plurality of signals are received; and
measuring a signal loss for each of the plurality of frequencies to determine whether each measured signal loss is acceptable; and
indicating by at least one indicator on the device whether each measured signal loss is acceptable.

19. The method for testing signals of claim 18, wherein the at least one indicator on the device indicates whether each measured signal loss is within an acceptable range.

* * * * *

UNITED STATES PATENT AND TRADEMARK OFFICE
CERTIFICATE OF CORRECTION

| | | |
|---|---|---|
| PATENT NO. | : 8,229,076 B2 | Page 1 of 1 |
| APPLICATION NO. | : 12/748995 | |
| DATED | : July 24, 2012 | |
| INVENTOR(S) | : S. Wollmershauser et al. | |

It is certified that error appears in the above-identified patent and that said Letters Patent is hereby corrected as shown below:

At column 10, line 34 (claim 18, line 11), "and" should be deleted after --;--.

Signed and Sealed this
Fifteenth Day of January, 2013

David J. Kappos
*Director of the United States Patent and Trademark Office*